US007761115B2

(12) United States Patent
Castaneda et al.

(10) Patent No.: US 7,761,115 B2
(45) Date of Patent: Jul. 20, 2010

(54) MULTIPLE MODE RF TRANSCEIVER AND ANTENNA STRUCTURE

(75) Inventors: Jesus Alfonso Castaneda, Los Angeles, CA (US); Franco De Flaviis, Irvine, CA (US); Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 963 days.

(21) Appl. No.: 11/443,946

(22) Filed: May 30, 2006

(65) Prior Publication Data

US 2007/0279287 A1 Dec. 6, 2007

(51) Int. Cl.
*H04M 1/00* (2006.01)
*H04B 1/38* (2006.01)

(52) U.S. Cl. .................. 455/562.1; 455/575.7; 455/69; 455/66.1; 455/447; 455/277.1; 455/135; 455/63.4; 343/895; 343/702; 343/821; 375/346

(58) Field of Classification Search ................ 455/66.1, 455/562.1, 561, 447, 69, 277.1, 135, 63.4, 455/575.7; 330/301; 343/895, 702, 821; 375/346
See application file for complete search history.

(56) References Cited

U.S. PATENT DOCUMENTS 5,614,863 A * 3/1997 Pierro et al. ................ 330/1 R
6,064,338 A * 5/2000 Kobayakawa et al. ....... 342/378
6,097,250 A * 8/2000 Kamali et al. ........... 330/124 R
6,140,975 A * 10/2000 Cohen ........................ 343/846
6,204,817 B1 * 3/2001 Edvardsson ................. 343/702
6,259,901 B1 * 7/2001 Shinomiya et al. ....... 455/127.3
6,392,610 B1 * 5/2002 Braun et al. ................ 343/876
6,809,581 B2 * 10/2004 Rofougaran et al. ........ 327/563
6,836,247 B2 * 12/2004 Soutiaguine et al. .. 343/700 MS
6,961,026 B2 * 11/2005 Toda .......................... 343/817
7,019,695 B2 * 3/2006 Cohen ................. 343/700 MS
7,088,185 B2 * 8/2006 Rofougaran ................ 330/301
7,142,829 B2 * 11/2006 Sung et al. .................. 455/101
7,272,359 B2 * 9/2007 Li et al. ................... 455/67.13
7,307,478 B2 * 12/2007 Anand ........................ 330/285
7,418,067 B1 * 8/2008 Li ............................. 375/347
7,430,430 B2 * 9/2008 Li et al. ...................... 455/522
7,433,725 B2 * 10/2008 Lin et al. ................. 455/575.7
7,504,948 B2 * 3/2009 Wulff et al. .............. 340/572.1
7,576,657 B2 * 8/2009 Duron et al. ............. 340/572.7
2007/0141997 A1 * 6/2007 Wulff et al. ................... 455/78
2007/0236400 A1 * 10/2007 Rentz ......................... 343/753
2007/0262914 A1 * 11/2007 Chau .......................... 343/895

* cited by examiner

*Primary Examiner*—Marceau Milord
(74) *Attorney, Agent, or Firm*—Garlick Harrison & Markison; Timothy W. Markison

(57) ABSTRACT

An antenna structure includes first and second antennas. The first antenna has a first geometry corresponding to a first frequency. The second antenna has a second geometry corresponding to a second frequency. The second antenna is proximal to the first antenna and utilizes electrical-magnetic properties of the first antenna to transceive signals at the second frequency.

17 Claims, 10 Drawing Sheets

MULTIPLE MODE RF TRANSCEIVER AND ANTENNA STRUCTURE

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to radio frequency (RF) transceivers and/or to antenna structures.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is further known, a multi-mode transceiver is one that is compliant with more than one wireless communication standard. For example, a multi-mode transceiver may be compliant with IEEE 802.11 a, b, or g and Bluetooth. For standards that utilize different frequency bands, the multi-mode transceiver typically includes separate RF front-ends (e.g., low noise amplifier, power amplifier, transmit receive switch, transformer balun, and/or antennas) for each frequency band. When one RF front-end is active, the other is inactive and vise versa. As such, one RF front-end is not leveraging the electrical and/or electro-magnetic properties of the other RF front-end.

Therefore, a need exists for a multiple mode RF transceiver and/or antenna structure that leverages electrical and/or electro-magnetic properties of other mode circuitry.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
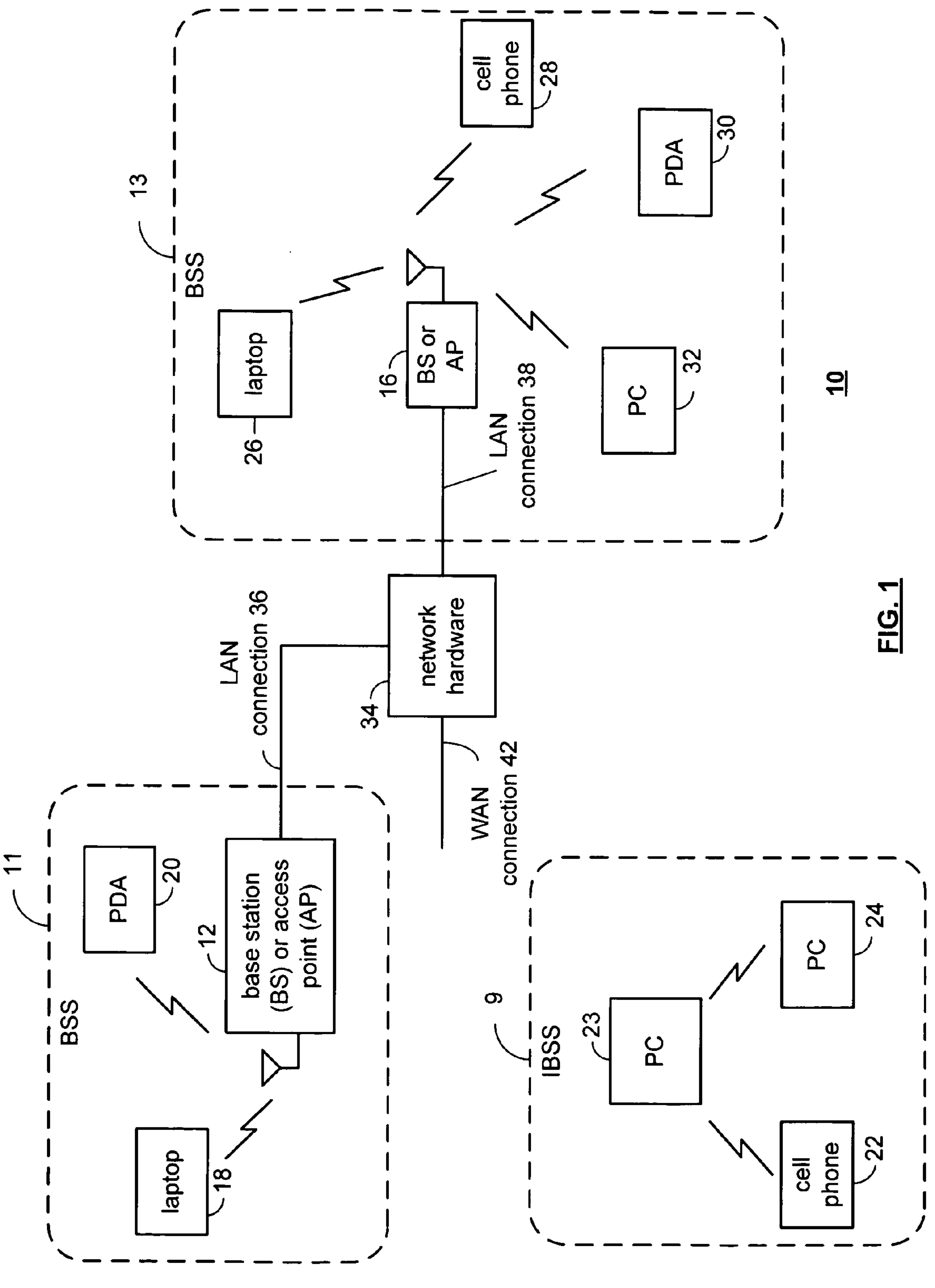
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12-16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, radio frequency identification (RFID), and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
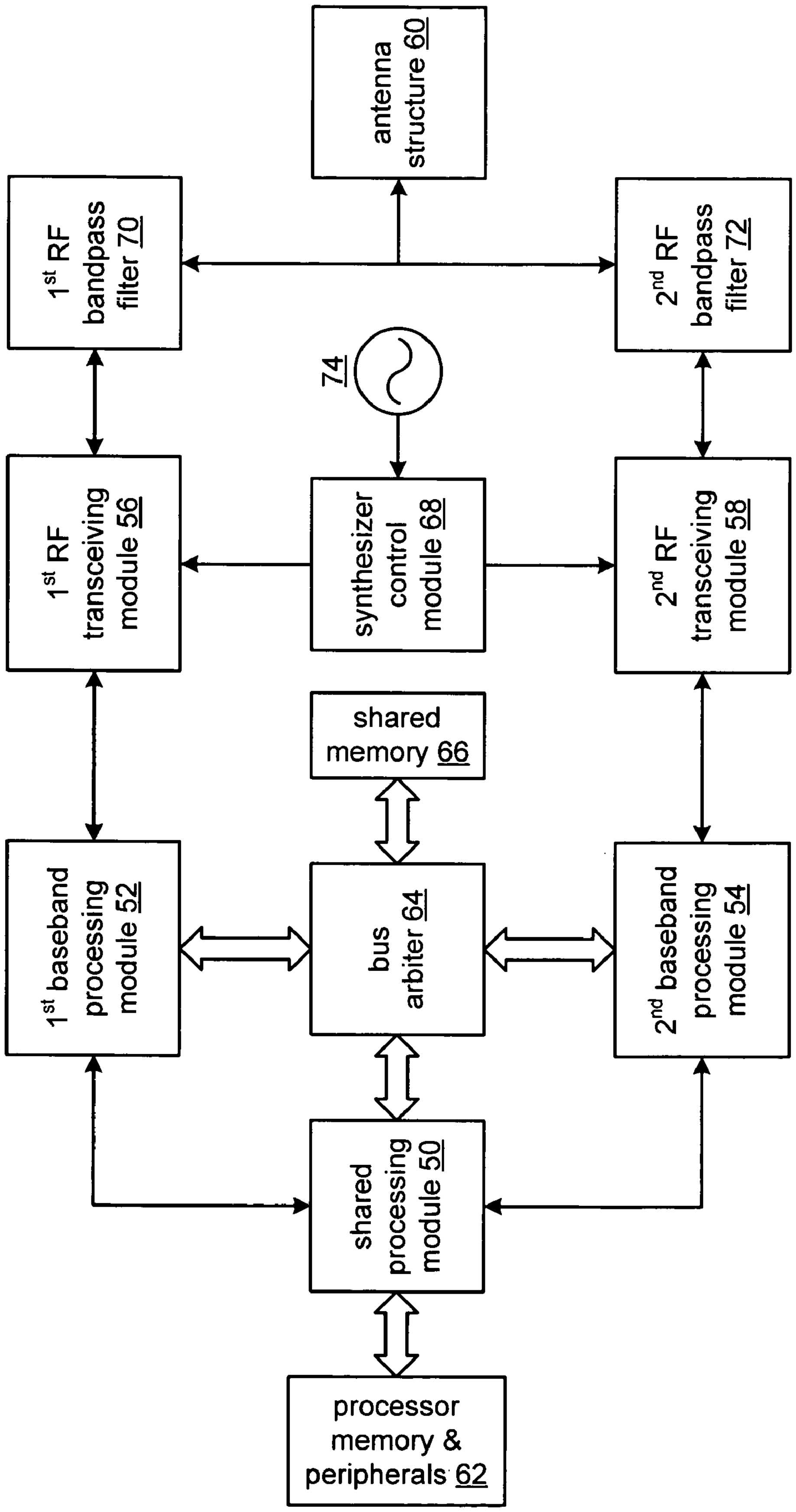
FIG. 2 is a schematic block diagram of a multiple mode RF transcevier in accordance with the present invention.

FIG. 2 is a schematic block diagram illustrating a multiple mode RF transceiver that may be included in any of the host devices 18-32. The multiple mode RF transceiver includes at least some of a shared processing module 50, $1^{st}$ and $2^{nd}$ baseband processing modules 52 and 54, $1^{st}$ and $2^{nd}$ RF transceiving modules 56 and 58, $1^{st}$ and $2^{nd}$ RF bandpass filters 70 and 72, an antenna structure 60, a bus arbiter 64, shared memory 66, processor memory & peripherals 62, a synthesizer control module 68, and an oscillator 74. The shared processing module 50, the $1^{st}$ baseband processing modules 52, and the $2^{nd}$ baseband processing modules 54 may be separate processing modules, one or more partially shared processing modules, and/or a fully shared processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element (e.g., shared memory 66 and/or processor memory 62), which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIG. 2.

In this embodiment, the multiple mode RF transceiver includes a $1^{st}$ mode path (e.g., elements 52, 56, and 70) and a $2^{nd}$ mode path (e.g., elements 54, 58, and 72). The $1^{st}$ mode path may be compliant with a first wireless communication standard (e.g., IEEE 802.11 a, b, or g, Bluetooth, ZigBee, radio frequency identification (RFID), etc.) and the $2^{nd}$ mode path may be compliant with a second wireless communication standard. For example, in one embodiment, the $1^{st}$ mode path may be complaint with a version of the RFID standard while the $2^{nd}$ mode path is compliant with a version of the Bluetooth standard. As one of ordinary skill in the art will appreciate, the multiple mode RF transceiver may include more that two mode paths for compliance with more than two standards.

In a $1^{st}$ mode of operation, the $2^{nd}$ path is generally inactive and the $1^{st}$ mode path is activated to transceive inbound and outbound data between the shared processing module 50 and the antenna structure. For example, the shared processing module 50 may provide outbound data to the $1^{st}$ baseband processing module 52. The $1^{st}$ baseband processing module 52 performs digital transmitter functions in accordance with the particular standard (e.g., IEEE 802.11, Bluetooth, RFID, et cetera) to which the $1^{st}$ mode path is compliant on the outbound data to produce outbound baseband signals. For example, the digital transmitter functions may include, but are not limited to, scrambling, encoding, puncturing, mapping, modulation, and/or digital baseband to IF conversion.

The $1^{st}$ baseband processing module 52 provides the outbound baseband signals to the $1^{st}$ RF transceiving module 56, which may include a digital-to-analog converter, a filtering/gain module, an up conversion module, and a power amplifier. The digital-to-analog converter converts the outbound baseband signals from the digital domain to the analog domain. The filtering/gain module filters and/or adjusts the gain of the analog signals prior to providing them to the up-conversion module. The up conversion module converts the analog baseband or low IF signals into RF signals based on a transmitter local oscillation provided by the synthesizer control module 68. The power amplifier amplifies the RF signals to produce outbound RF signals.

The 1$^{st}$ RF bandpass filter 70 filters the outbound RF signals and provides them to the antenna structure 60, which will be described in greater detail with reference to FIGS. 4-12.

For inbound data, the antenna structure 68 receives inbound RF signals that are subsequently filtered by the 1$^{st}$ bandpass filter 70. The filter 70 provides the filtered inbound RF signals to the 1$^{st}$ RF transceiving module 56, which may further include a low noise amplifier, a down conversion module, a high pass and/or low pass filter module, and an analog-to-digital converter. The low noise amplifier amplifies the inbound RF signals to produce an amplified inbound RF signals and provides them to the down conversion module. The down conversion module converts the amplified inbound RF signals into an inbound low IF signals or baseband signals based on a receiver local oscillation provided by synthesizer control module 68 and provides them to the filtering/gain module. The filter/gain module 68 filters the inbound low IF signals or the inbound baseband signals to produce filtered inbound signals.

The analog-to-digital converter converts the filtered inbound signals from the analog domain to the digital domain to produce inbound baseband signals, where the inbound baseband signals will be digital baseband signals or digital low IF signals (e.g., low IF typically will be in the frequency range of one hundred kilohertz to a few megahertz.). The 1$^{st}$ baseband processing module 52 processes the digital baseband or low IF signals to produce inbound data that is provided to the shared processing module 50. The processing performed by the 1$^{st}$ baseband processing module 52 is in accordance with the corresponding standard any may include, but is not limited to, digital intermediate frequency to baseband conversion, demodulation, demapping, depuncturing, decoding, and/or descrambling.

In a 2$^{nd}$ mode of operation, the 1$^{st}$ path is generally inactive and the 2$^{nd}$ path is active to transceive inbound and outbound data between the shared processing module 50 and the antenna structure 60 in accordance with a different standard. The transceiving of inbound and outbound data between the shared processing module 50 and the antenna structure 60 by the 2$^{nd}$ path will be similar to the transceiving performed by the 1$^{st}$ path, but in accordance with a different standard.

Figure 3:
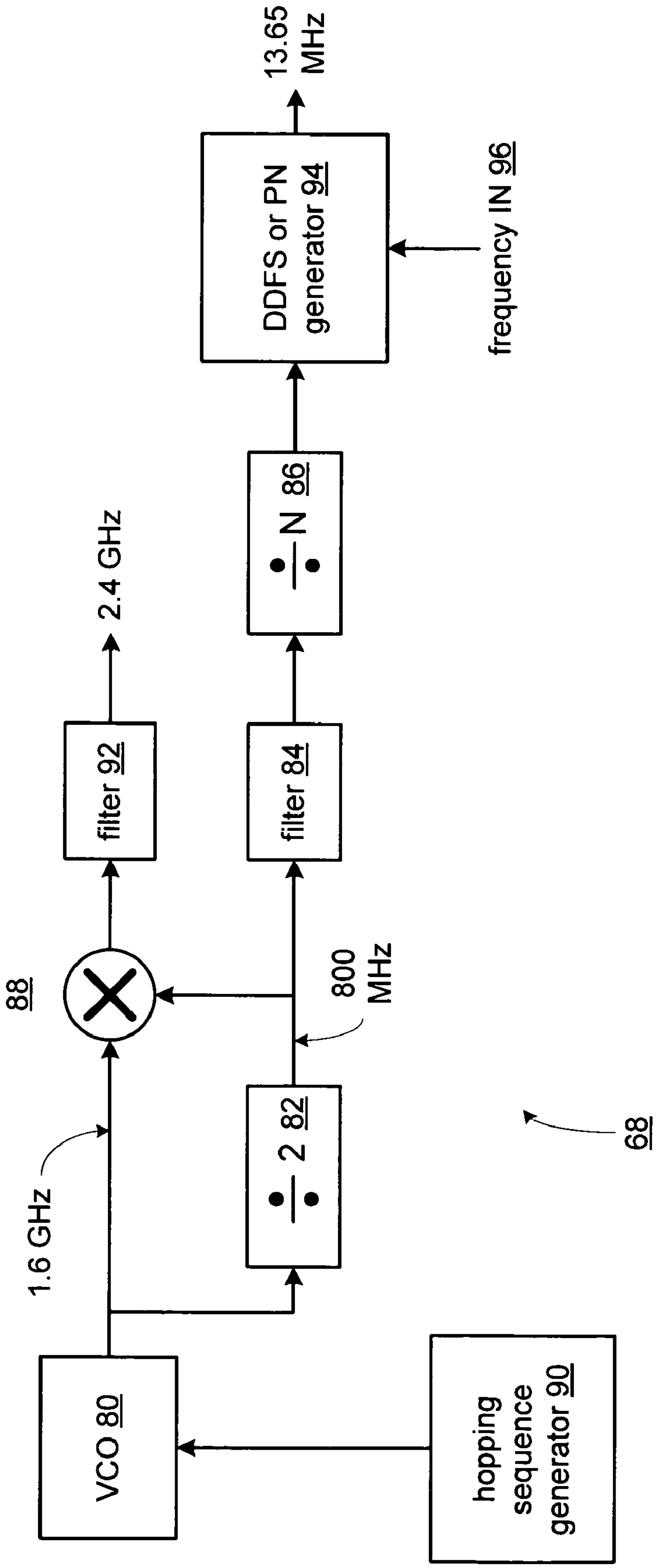
FIG. 3 is a schematic block diagram of a synthesizer control module in accordance with the present invention.

FIG. 3 is a schematic block diagram of a synthesizer control module 68 that includes a voltage controlled oscillation (VCO) 80, a divided by two module 82, a filter 84, a divide by N module 86, a multiplier 88, a hopping sequence generator 90, and a direct digital frequency synthesizer (DDFS) or pseudo random number (PN) generator module 94. In this embodiment, the synthesizer control module 68 is shared between the two modes of the RF transceiver and may produce a local oscillation for RFID operation (e.g., 13.65 MHz, or 900 MHz) and a local oscillation for Bluetooth, 802.11 b or g, or ZigBee (e.g., 2.4 GHz).

As shown, the VCO 80 produces a 1.6 GHz oscillation in accordance with a frequency hopping sequence provided by the hopping sequence generator 90 for certain modes of operation (e.g., spread spectrum, frequency hopping, code division multiplex access (CDMA), etc.). Alternatively, the frequency hopping sequence may be omitted for other modes of operation (e.g., orthogonal frequency division multiplexing (OFDM)). The divide by two module 82 divides the 1.6 GHz oscillation to produce an 800 MHz oscillation. The multiplier 88 multiplies the 1.6 GHz oscillation with the 800 MHz oscillation to produce a 2.4 GHz oscillation. The filter 92 filters the 2.4 GHz oscillation to produce a 2.4 GHz local oscillation.

Filter 84 filters the 800 MHz oscillation, which is subsequently divided by the divide by N module 86 to produce a reference oscillation. The DDFS or PN generator 94 produces a 13.65 MHz local oscillation from the reference oscillation and a frequency input 96. Note that the DDFS or PN generator 94 may produce other frequency values for the local oscillation of the 1$^{st}$ path (e.g., the RFID path).

Figure 4:
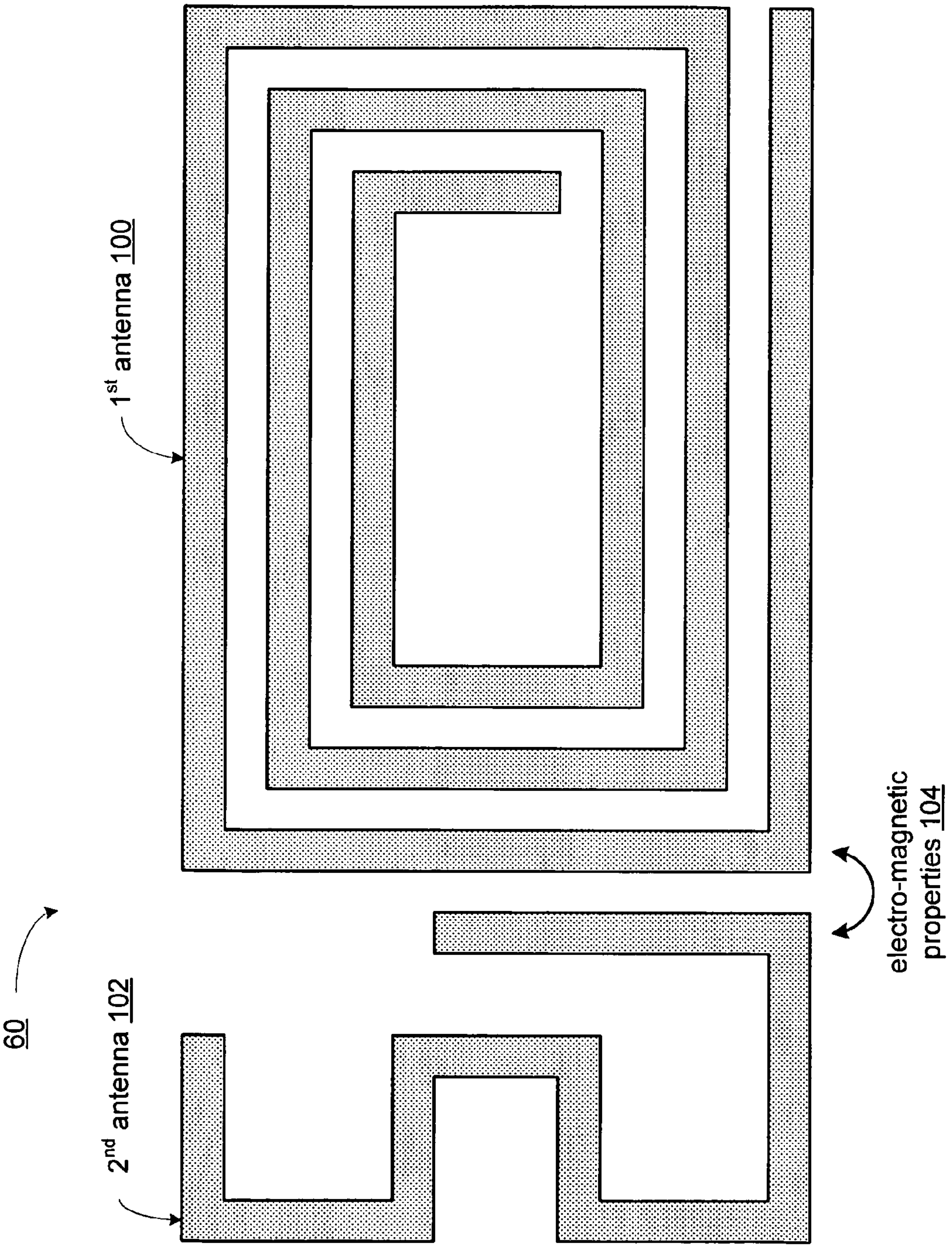
FIG. 4 is a diagram of an embodiment of an antenna structure in accordance with the present invention.

FIG. 4 is a diagram of an embodiment of the antenna structure 60 that includes a 1$^{st}$ antenna 100 and a 2$^{nd}$ antenna 102. The first antenna 100 has a first geometry (e.g., a square, rectangular, circular, and/or oval coil) corresponding to a first frequency (e.g., 13.65 MHz for RFID operation). The second antenna 102 a second geometry (e.g., an inverted F metal assembly, a meandering trace with an inductive tuning stub, meandering line, and a printed inverted F pattern) corresponding to a second frequency (e.g., a 2.4 GHz). The second antenna 102 is proximal to the first antenna 100 and utilizes electrical-magnetic properties 104 of the first antenna 100 to transceive signals at the second frequency. Note that the 1$^{st}$ and 2$^{nd}$ antennas 100 and 102 may be on the same supporting substrate (e.g., a printed circuit board (PCB), a low temperature co-fired ceramic (LTCC) substrate, or an organic substrate) or different supporting substrates, may be metal traces printed on the supporting substrate(s), and/or may be a conductive material mounted on the supporting substrate(s).

Figure 5:
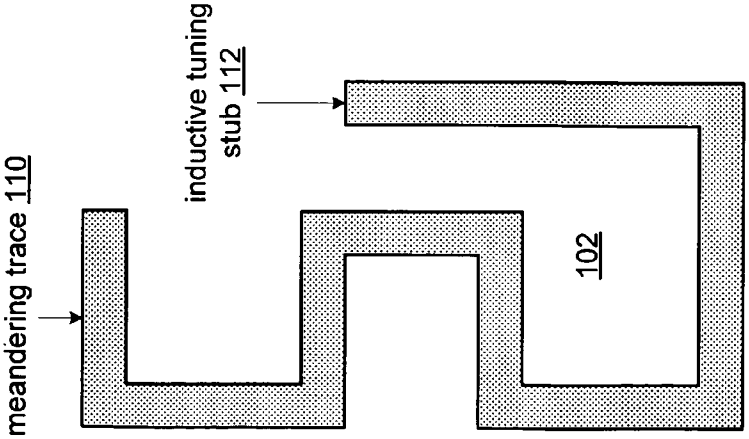
FIGS. 5-7 are diagrams of various embodiments of a second antenna in accordance with the present invention.
Figure 6:
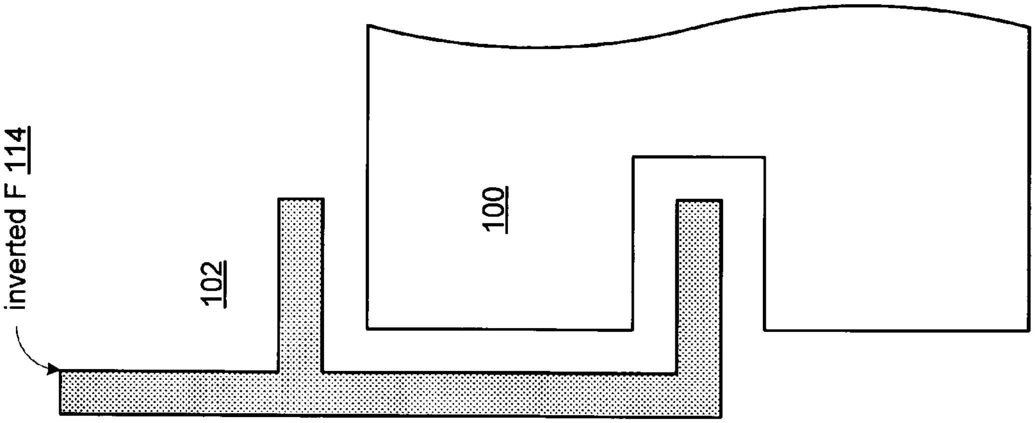
Figure 7:
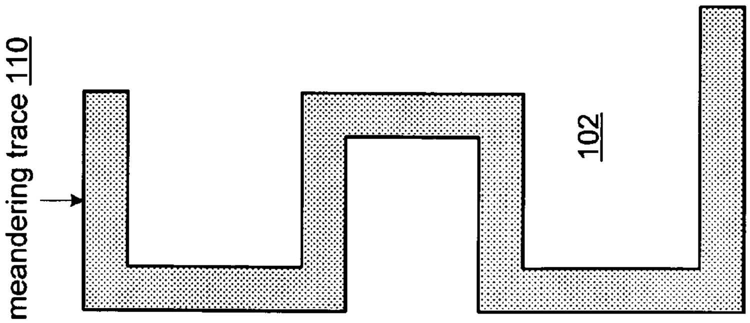

FIGS. 5-7 are diagrams of various embodiments of a second antenna 102. In FIG. 5, the second antenna 102 includes a meandering trace 110 and an inductive tuning stub 112. The length, width, and/or spacing of the meandering trace 110 may be selected to obtain a desired impedance (e.g., approximately 50 Ohms) within a desired frequency range (e.g., 2.4 or 5.2 GHz). The inductive tuning stub 112 allows the resonance and/or impedance of the meandering trace 110 to be more accurately selected. Note that the meandering trace 110 and/or the inductive tuning stub 112 may be printed on a supporting substrate and/or may be a conductive material mounted on the supporting substrate.

In FIG. 6, the second antenna 102 includes an inverted F structure where the first antenna 100 is positioned as shown. The length, width, and/or spacing of the inverted F structure may be selected to obtain a desired impedance (e.g., approximately 50 Ohms) within a desired frequency range (e.g., 2.4 or 5.2 GHz). Note that the inverted F structure may be printed on a supporting substrate or may be a conductive material mounted on the supporting substrate.

In FIG. 7, the second antenna 102 includes the meandering trace 110 without the inductive tuning stub 112. The length, width, and/or spacing of the meandering trace 110 may be selected to obtain a desired impedance (e.g., approximately 50 Ohms) within a desired frequency range (e.g., 2.4 or 5.2 GHz). Note that the meandering trace 110 may be printed on a supporting substrate or may be a conductive material mounted on the supporting substrate.

Figure 8:
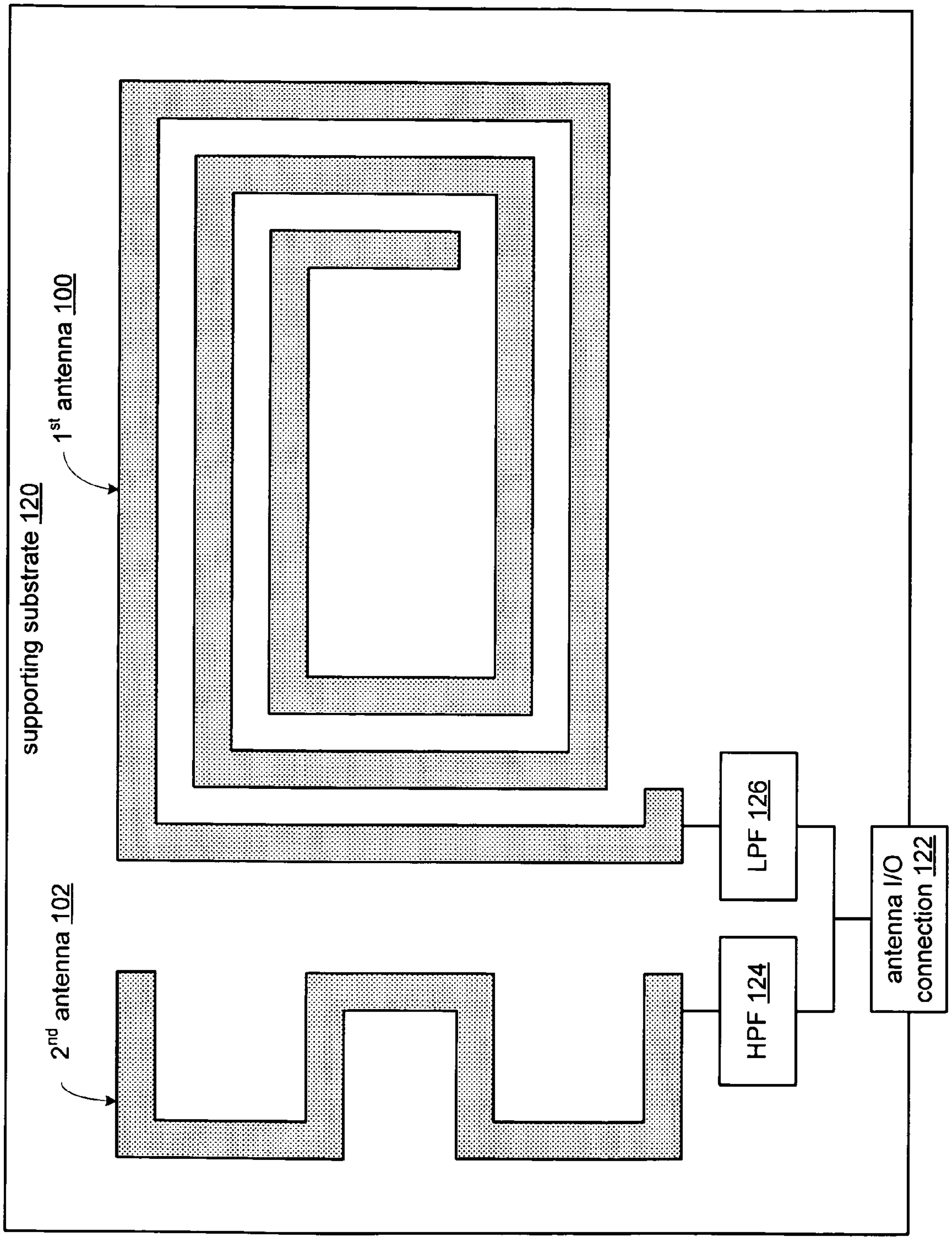
FIG. 8 is a diagram of another embodiment of an antenna structure in accordance with the present invention.

FIG. 8 is a diagram of another embodiment of an antenna structure that includes the 1$^{st}$ antenna 100, the 2$^{nd}$ antenna 102, an antenna input/output (I/O) connection 122, a high pass filter (HPF) 124, and a low pass filter (LPF) 126 on a supporting substrate 120 (e.g., a PCB, a (LTCC) substrate, or an organic substrate). The antenna I/O connection 122 may be a PCB connector, a coaxial cable connection, a transmission line connection, and/or any other device for electrically coupling the antenna structure to the multiple mode RF transceiver.

As shown, the HPF 124, which may be a capacitor, couples the 2$^{nd}$ antenna 102 to the antenna I/O connection 122 and the LPF 126, which may be an inductor, couples the 1$^{st}$ antenna 100 to the antenna I/O connection 122. In addition, the 2$^{nd}$ antenna 102 is coupled to the 1$^{st}$ antenna 100 via the HPF 124 and the LPF 126 such that when the $2^{nd}$ antenna is transceiving signals at a second frequency, the $1^{st}$ antenna is functioning as a ground plane.

As an example, assume that the $2^{nd}$ antenna 102, which may have the meandering trace structure or another structure, is designed to transceive WLAN signals such as IEEE 802.11x, Bluetooth, and/or ZigBee signals at 2.4 GHz and the $1^{st}$ antenna 100 is designed to transceive RFID signals at 13.65 MHz. In this example, the HPF 124 may have a corner frequency of at least 136.5 MHz (e.g., 10 times the frequency of the $1^{st}$ antenna) with an attenuation of at least 20 dB per decade of frequencies below the corner frequency and the LPF 126 may have a corner frequency of 136.5 MHz with an attenuation of at least 20 dB per decade of frequencies above the corner frequency.

Figure 9:
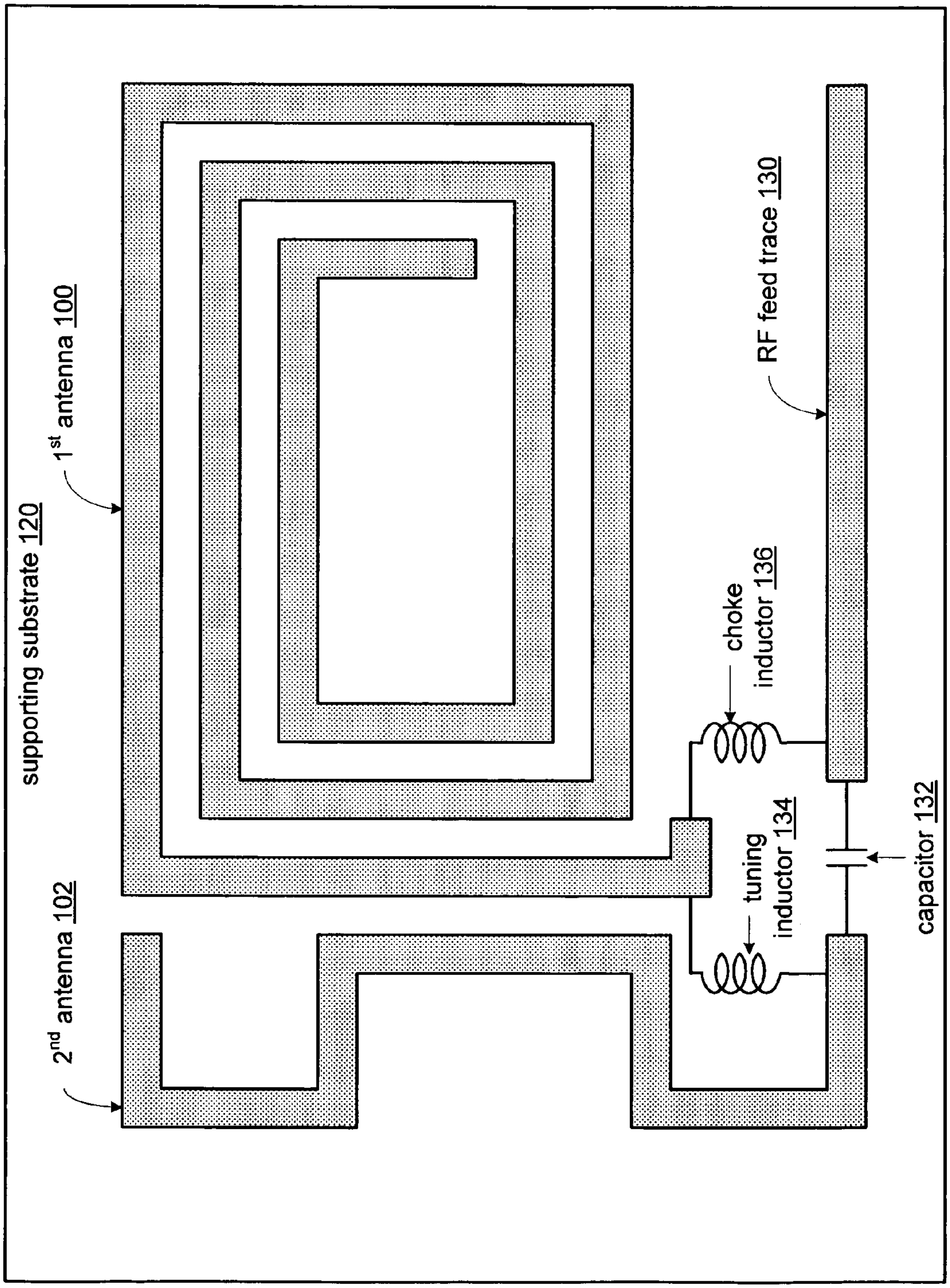
FIG. 9 is a diagram of another embodiment of an antenna structure in accordance with the present invention.

FIG. 9 is a diagram of another embodiment of an antenna structure that includes the $1^{st}$ antenna 100, the $2^{nd}$ antenna 102, an RF feed trace 130, a capacitor 132, a tuning inductor 134, and a choke inductor 136 on the supporting substrate 120. The RF feed trace 130, which may be a conductive material printed or mounted on the supporting substrate, provides an I/O connection for the antenna structure. The choke inductor 136 has an inductance such that, at frequencies of signals transceived by the $1^{st}$ antenna, the choke inductor 136 has a low impedance (e.g., is functioning as a short) and, at frequencies of signals transceived by the $2^{nd}$ antenna, the choke inductor 136 has a high impedance (e.g., is functioning as an open).

The capacitor 132 has a capacitance such that, at frequencies of signals transceived by the $1^{st}$ antenna, the capacitor 132 has a high impedance (e.g., is functioning as an open) and, at frequencies of signals transceived by the $2^{nd}$ antenna, the capacitor 132 has a low impedance (e.g., is functioning as a short). The tuning inductor 134 has an inductance to tune the impedance of the $2^{nd}$ antenna at frequencies of signals transceived by the $2^{nd}$ antenna.

As an example, assume that the $2^{nd}$ antenna 102, which may have the meandering trace structure or another structure, is designed to transceive WLAN, Bluetooth, or ZigBee signals at 2.4 GHz and the $1^{st}$ antenna 100 is designed to transceive RFID signals at 13.65 MHz. In this example, the choke inductor 136 may have an inductance such that at 13.65 MHz it has an impedance of a few Ohms and at 2.4 GHz it has an impedance approaching a thousand Ohms. Further, the capacitor 132 may have a capacitance such that at 2.4 GHz it has an impedance of a few Ohms and at 13.65 MHz it has an impedance approaching a thousand Ohms. Still further, the tuning inductor 134 may have an inductance such that at 2.4 GHz it has an impedance of a few Ohms.

Figure 10:
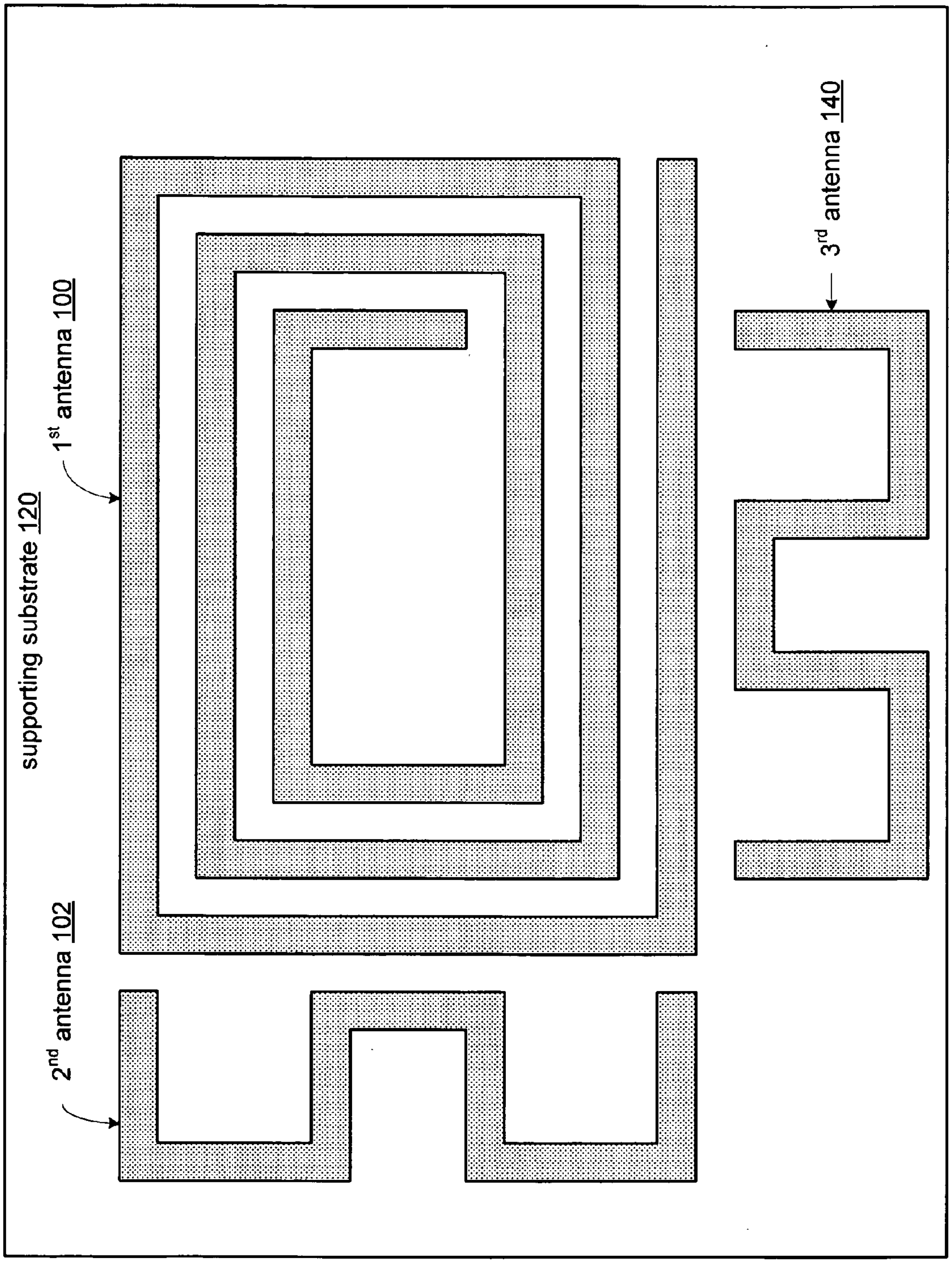
FIG. 10 is a diagram of another embodiment of an antenna structure in accordance with the present invention.

FIG. 10 is a diagram of another embodiment of an antenna structure that includes the $1^{st}$ antenna 100, the $2^{nd}$ antenna 102, and a $3^{rd}$ antenna 140 on the supporting substrate 120. In this embodiment, the $3^{rd}$ antenna 140 has the second geometry corresponding to the second frequency (e.g., same as the $2^{nd}$ antenna 102) but has a different polarization than the $2^{nd}$ antenna 102. The $3^{rd}$ antenna 140 is proximal to the $1^{st}$ antenna 100 and utilizes electrical-magnetic properties of the $1^{st}$ antenna to transceive the signals at the second frequency.

As an example, the $1^{st}$ antenna 100 may be an RFID antenna, the $2^{nd}$ antenna may be a first WLAN RF antenna and the $3^{rd}$ antenna 140 is a second WLAN RF antenna. In this example, the first and second WLAN RF antennas use the RFID antenna as a ground plane and have different polarizations.

Figure 11:
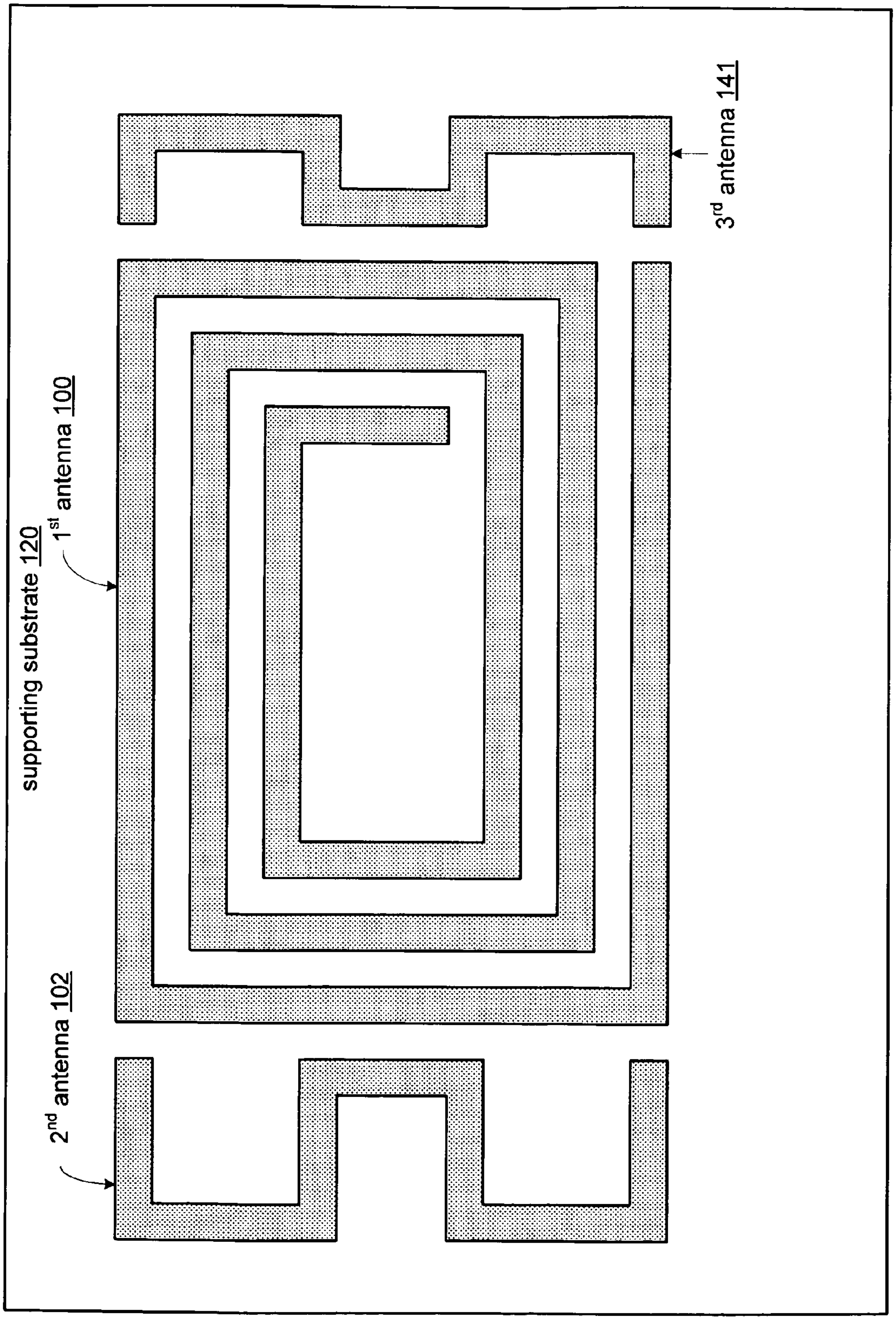
FIG. 11 is a diagram of another embodiment of an antenna structure in accordance with the present invention.

FIG. 11 is a diagram of another embodiment of an antenna structure that includes the $1^{st}$ antenna 100, the $2^{nd}$ antenna 102, and a $3^{rd}$ antenna 141 on the supporting substrate 120. In this embodiment, the $3^{rd}$ antenna 141 has a third geometry corresponding to a third frequency (e.g., 5 GHz). In this embodiment, the $3^{rd}$ antenna 141 is proximal to the $1^{st}$ antenna 100 and utilizes electrical-magnetic properties of the $1^{st}$ antenna 100 to transceive signals at the third frequency.

Figure 12:
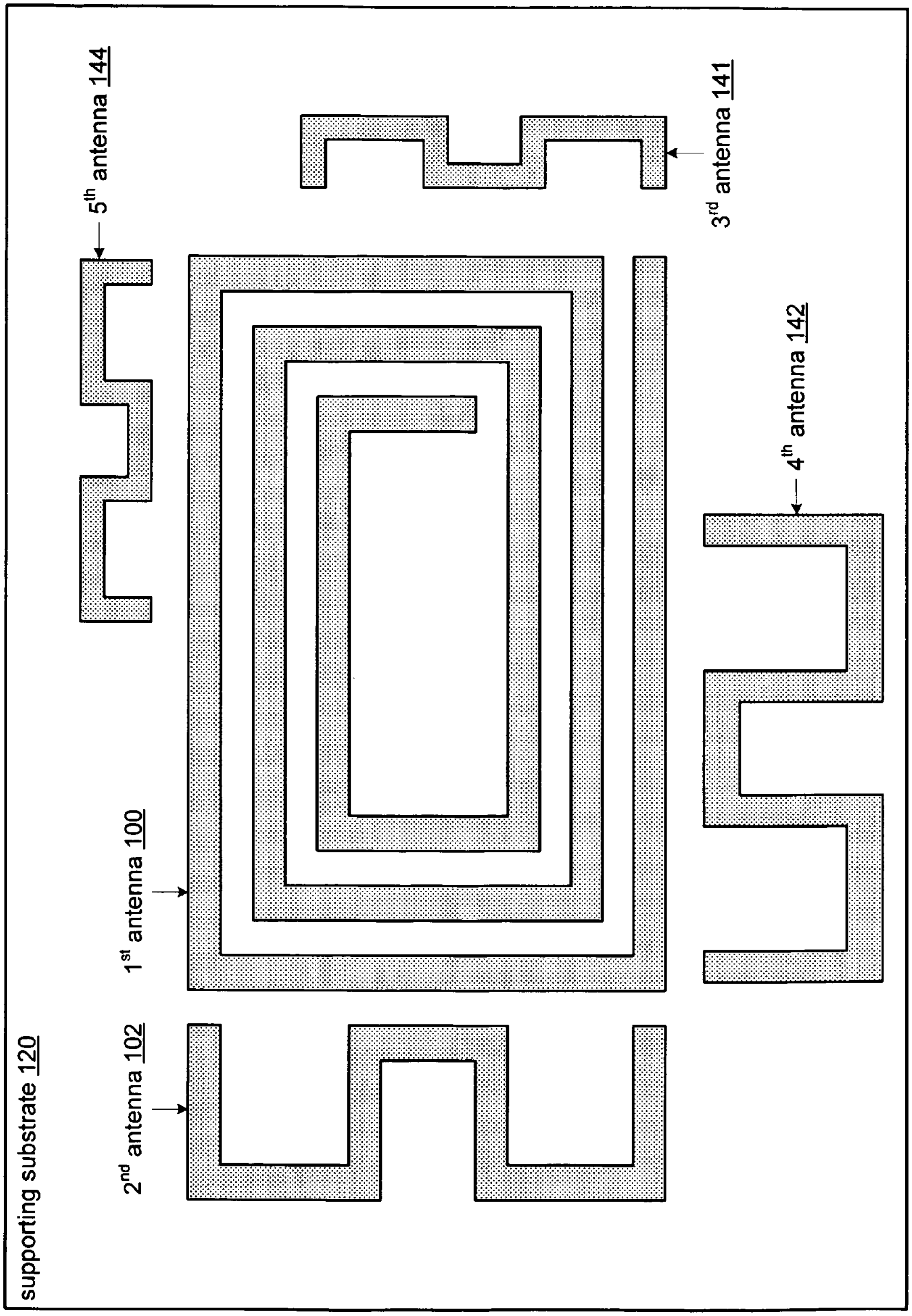
FIG. 12 is a diagram of another embodiment of an antenna structure in accordance with the present invention.

FIG. 12 is a diagram of another embodiment of an antenna structure that includes five antennas 100, 102, 141, 142, and 144 on the supporting substrate 120. The $2^{nd}$ and $4^{th}$ antennas 102 and 142 have the second geometry corresponding to the second frequency (e.g., 2.4 GHz). The $2^{nd}$ and $4^{th}$ antennas 102 and 142 are proximal to the $1^{st}$ antenna 100, but have different polarizations. The $2^{nd}$ and $4^{th}$ antennas 102 and 142 utilize electrical-magnetic properties of the $1^{st}$ antenna 100 to transceive the signals at the second frequency.

The $3^{rd}$ and $5^{th}$ antennas 141 and 144 have the third geometry corresponding to the third frequency (e.g., 5 GHz). The $3^{rd}$ and $5^{th}$ antennas 141 and 144 are proximal to the $1^{st}$ antenna 100, but have different polarizations. The $3^{rd}$ and $5^{th}$ antennas 141 and 144 utilize electrical-magnetic properties of the $1^{st}$ antenna 100 to transceive the signals at the third frequency.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments of an antenna structure and a multiple mode RF transceiver. As one of ordinary skill in the art will appreciate, other embodiments may be derived from the teachings of the present invention without deviating from the scope of the claims.

What is claimed is:

1. An antenna structure comprises:

a first antenna having a first geometry corresponding to a first frequency;

a second antenna having a second geometry corresponding to a second frequency, wherein the second antenna is proximal to the first antenna, and wherein the second antenna utilizes electrical-magnetic properties of the first antenna to transceive signals at the second frequency;

a third antenna having a third geometry corresponding to a third frequency, wherein the third antenna is proximal to the first antenna, and wherein the third antenna utilizes electrical-magnetic properties of the first antenna to transceive signals at the third frequency; and a fourth antenna having the second geometry corresponding to the second frequency, wherein the fourth antenna is proximal to the first antenna and has a different polarization than the second antenna, and wherein the fourth antenna utilizes the electrical-magnetic properties of the first antenna to transceive the signals at the second frequency.

2. The antenna structure of claim 1, wherein the second antenna utilizes the first antenna as a ground plane.

3. The antenna structure of claim 1 further comprises:

a ground plane capacitively coupled to the first antenna, wherein the ground plane and the first antenna function as an extended ground plane for the second antenna.

4. The antenna structure of claim 1, wherein:

the first geometry includes a coil; and the second geometry includes at least one of: an inverted F metal assembly, a meandering trace with an inductive tuning stub, meandering line, and a printed inverted F pattern.

5. The antenna structure of claim 1 further comprises:

an antenna input/output connection;

a high pass filter operably coupled between the antenna input/output connection and the second antenna; and a low pass filter operably coupled between the antenna input/output connection and the first antenna.

6. The antenna structure of claim 1 further comprises:

an radio frequency (RF) feed trace operable to transceive RF signals at the first and second frequencies;

a capacitor coupling the RF feed trace to the second antenna;

a tuning inductor coupling the second antenna to the first antenna; and a choke inductor coupling the RF feed trace to the first antenna.

7. The antenna structure of claim 1 further comprises:

a fifth antenna having the third geometry corresponding to the third frequency, wherein the fifth antenna is proximal to the first antenna and has a different polarization than the third antenna, and wherein the fifth antenna utilizes electrical-magnetic properties of the first antenna to transceive the signals at the third frequency.

8. A multiple mode radio frequency (RF) transceiver comprises:

a shared processing module operably coupled to transceived first data and second data;

a first baseband processing module operably coupled to convert first inbound baseband signals into first inbound data of the first data and to convert first outbound data of the first data into first outbound baseband signals;

a second baseband processing module operably coupled to convert second inbound baseband signals into second inbound data of the second data and to convert second outbound data of the second data into second outbound baseband signals;

a first RF transceiving module operably coupled to convert the first outbound baseband signals into first outbound RF signals and to convert first inbound RF signals into the first inbound baseband signals;

a second RF transceiving module operably coupled to convert the second outbound baseband signals into second outbound RF signals and to convert second inbound RF signals into the second inbound baseband signals; and an antenna structure that includes a first antenna and a second antenna, wherein the first antenna has a first geometry for receiving the first inbound RF signals and for transmitting the first outbound RF signals and the second antenna has a second geometry for receiving the second inbound RF signals and for transmitting the second outbound RF signals, wherein the second antenna is proximal to the first antenna, and wherein the second antenna utilizes electrical-magnetic properties of the first antenna to transceive the first inbound and outbound RF signals.

9. The multiple mode RF transceiver of claim 8, wherein the second antenna utilizes the first antenna as a ground plane.

10. The multiple mode RF transceiver of claim 8, wherein:

the first geometry includes a coil; and the second geometry includes at least one of: an inverted F metal assembly, a meandering trace with an inductive tuning stub, meandering line, and a printed inverted F pattern.

11. The multiple mode RF transceiver of claim 8, wherein the antenna structure further comprises:

an antenna input/output connection;

a high pass filter operably coupled between the antenna input/output connection and the second antenna; and a low pass filter operably coupled between the antenna input/output connection and the first antenna.

12. The multiple mode RF transceiver of claim 8, wherein the antenna structure further comprises:

an radio frequency (RF) feed trace operable to transceive the first and second inbound and outbound RF signals;

a capacitor coupling the RF feed trace to the second antenna;

a tuning inductor coupling the second antenna to the first antenna; and a choke inductor coupling the RF feed trace to the first antenna.

13. The multiple mode RF transceiver of claim 8, wherein the antenna structure further comprises:

a third antenna having the second geometry for receiving the first inbound RF signals and for transmitting the first outbound RF signals, wherein the third antenna is proximal to the first antenna and has a different polarization than the second antenna, and wherein the third antenna utilizes electrical-magnetic properties of the first antenna to transceive the first inbound and outbound RF signals.

14. An antenna structure comprises:

a radio frequency identification (RFID) antenna coil, a wireless local area network (WLAN) radio frequency (RF) antenna, wherein the WLAN RF antenna utilizes the RFID antenna as ground plane; and a second WLAN RF antenna operably coupled to transceive WLAN RF signals at a different frequency than the WLAN RF antenna, wherein the second WLAN RF antenna utilizes the RFID antenna as ground plane;

a third WLAN RF antenna that utilizes the RFID antenna as the ground plane and has a different polarization than the WLAN RF antenna; and a fourth WLAN RF antenna operably coupled to transceive the WLAN RF signals at the different frequency than the WLAN RF antenna and the second WLAN RF antenna, wherein the fourth WLAN RF antenna utilizes the RFID antenna as ground plane and has a different polarization than the second WLAN RF antenna.

15. The antenna structure of claim 14 further comprises:

an antenna input/output connection;

a high pass filter operably coupled between the antenna input/output connection and the WLAN RF antenna; and a low pass filter operably coupled between the antenna input/output connection and the RFID antenna.

16. The antenna structure of claim 14 further comprises:

an radio frequency (RF) feed trace;

a capacitor coupling the RF feed trace to the WLAN RF antenna;

a tuning inductor coupling the WLAN RF antenna to the RFID antenna; and a choke inductor coupling the RF feed trace to the RFID antenna.

17. The antenna structure of claim 14 further comprises: a second WLAN RF antenna that utilizes the RFID antenna as the ground plane and has a different polarization than the WLAN RF antenna.

* * * * *